United States Patent [19]

Nibby et al.

[11] 3,814,922

[45] June 4, 1974

[54] AVAILABILITY AND DIAGNOSTIC APPARATUS FOR MEMORY MODULES

[75] Inventors: Chester M. Nibby, Billerica; John C. Manton, Marlboro; Benjamin S. Franklin, Boston; John L. Curley, Sudbury, all of Mass.

[73] Assignee: Honeywell Information Systems, Inc., Waltham, Mass.

[22] Filed: Dec. 1, 1972

[21] Appl. No.: 311,074

[52] U.S. Cl. .......... 235/153 AK

[51] Int. Cl. .......... G06f 11/04

[58] Field of Search .......... 235/153 AM, 153 AK; 340/172.5, 174 TC, 174 ED, 174 R

[56] References Cited

UNITED STATES PATENTS

| | | | |
|---|---|---|---|
| 3,343,141 | 9/1967 | Hackl | 235/153 AK |
| 3,387,262 | 6/1968 | Ottaway et al. | 235/153 AM |
| 3,735,105 | 5/1973 | Maley | 235/153 AK |

*Primary Examiner*—Charles E. Atkinson
*Attorney, Agent, or Firm*—Ronald T. Reiling

[57] ABSTRACT

In a semiconductor memory module associated with a data processing unit, a maintenance status register and associated apparatus identity and store information relating to erros arising in the memory module. The stored information is transferred from the maintenance status register, upon receipt of a proper command signal, to the data processing unit for diagnostic and availability analysis. A mode of operation of the maintenance status register is provided for checking logic circuits associated with the refresh apparatus of the semiconductor memory elements under control of the data processing unit. Information concerning errors in data entering the memory module is also available to the maintenance status register and associated equipment.

23 Claims, 7 Drawing Figures

ECC/BYTE PARITY MODE

| Bit | Field | Subfield | Name |
|---|---|---|---|
| 00 | MODE | | BYTE PARITY |
| 01 | MODE | | REFRESH |
| 02 | CORRECTED ERROR COUNT (CEC) | | CEC-OVERFLOW |
| 03 | CORRECTED ERROR COUNT (CEC) | | CEC-8 |
| 04 | CORRECTED ERROR COUNT (CEC) | | CEC-4 |
| 05 | CORRECTED ERROR COUNT (CEC) | | CEC-2 |
| 06 | CORRECTED ERROR COUNT (CEC) | | CEC-1 |
| 07 | ERROR FIELD | DATA OUT ERROR | SINGLE-BIT |
| 08 | ERROR FIELD | DATA OUT ERROR | MULTI-BIT |
| 09 | ERROR FIELD | DRE | DRIVER |
| 10 | ERROR FIELD | ADDRESS IN ERROR (AIE) | AIE-1 |
| 11 | ERROR FIELD | ADDRESS IN ERROR (AIE) | AIE-2 |
| 12 | ERROR FIELD | ADDRESS IN ERROR (AIE) | AIE-3 |
| 13 | ERROR FIELD | MKE | MASK |
| 14 | ERROR FIELD | DATA IN ERROR (DIE) | DIE-0 |
| 15 | ERROR FIELD | DATA IN ERROR (DIE) | DIE-1 |
| 16 | ERROR FIELD | DATA IN ERROR (DIE) | DIE-2 |
| 17 | ERROR FIELD | DATA IN ERROR (DIE) | DIE-3 |
| 18 | ERROR FIELD | DATA IN ERROR (DIE) | DIE-4 |
| 19 | ERROR FIELD | DATA IN ERROR (DIE) | DIE-5 |
| 20 | ERROR FIELD | DATA IN ERROR (DIE) | DIE-6 |
| 21 | ERROR FIELD | DATA IN ERROR (DIE) | DIE-7 |
| 22 | FAILING UNIT LOCATOR | BLOCK | ADD-11 |
| 23 | FAILING UNIT LOCATOR | BLOCK | ADD-12 |
| 24 | FAILING UNIT LOCATOR | SYNDROME | SYN-0 |
| 25 | FAILING UNIT LOCATOR | SYNDROME | SYN-1 |
| 26 | FAILING UNIT LOCATOR | SYNDROME | SYN-2 |
| 27 | FAILING UNIT LOCATOR | SYNDROME | SYN-3 |
| 28 | FAILING UNIT LOCATOR | SYNDROME | SYN-4 |
| 29 | FAILING UNIT LOCATOR | SYNDROME | SYN-5 |
| 30 | FAILING UNIT LOCATOR | SYNDROME | SYN-6 |
| 31 | FAILING UNIT LOCATOR | SYNDROME | SYN-7 |

ECC/BYTE PARITY MODE WITH CLOCK ERROR

| Bit | Field | Subfield | Name |
|---|---|---|---|
| 00 | MODE | | BYTE PARITY |
| 01 | MODE | | REFRESH |
| 02 | CORRECTED ERROR COUNT (CEC) | | CEC-OVERFLOW |
| 03 | CORRECTED ERROR COUNT (CEC) | | CEC-8 |
| 04 | CORRECTED ERROR COUNT (CEC) | | CEC-4 |
| 05 | CORRECTED ERROR COUNT (CEC) | | CEC-2 |
| 06 | CORRECTED ERROR COUNT (CEC) | | CEC-1 |
| 07 | ERROR FIELD | DATA OUT ERROR | SINGLE-BIT |
| 08 | ERROR FIELD | DATA OUT ERROR | MULTI-BIT |
| 09 | ERROR FIELD | DRE | DRIVER |
| 10 | ERROR FIELD | ADDRESS IN ERROR (AIE) | AIE-1 |
| 11 | ERROR FIELD | ADDRESS IN ERROR (AIE) | AIE-2 |
| 12 | ERROR FIELD | ADDRESS IN ERROR (AIE) | AIE-3 |
| 13 | ERROR FIELD | MKE | MASK |
| 14 | ERROR FIELD | DATA IN ERROR (DIE) | DIE-0 |
| 15 | ERROR FIELD | DATA IN ERROR (DIE) | DIE-1 |
| 16 | ERROR FIELD | DATA IN ERROR (DIE) | DIE-2 |
| 17 | ERROR FIELD | DATA IN ERROR (DIE) | DIE-3 |
| 18 | ERROR FIELD | DATA IN ERROR (DIE) | DIE-4 |
| 19 | ERROR FIELD | DATA IN ERROR (DIE) | DIE-5 |
| 20 | ERROR FIELD | DATA IN ERROR (DIE) | DIE-6 |
| 21 | ERROR FIELD | DATA IN ERROR (DIE) | DIE-7 |
| 22 | FAILING UNIT LOCATOR | BLOCK | ADD-11 |
| 23 | FAILING UNIT LOCATOR | BLOCK | ADD-12 |
| 24 | FAILING UNIT LOCATOR | BOARD NUMBER | BD-1 |
| 25 | FAILING UNIT LOCATOR | BOARD NUMBER | BD-2 |
| 26 | FAILING UNIT LOCATOR | BOARD NUMBER | BD-3 |
| 27 | FAILING UNIT LOCATOR | BOARD NUMBER | BD-4 |
| 28 | FAILING UNIT LOCATOR | BOARD NUMBER | BD-5 |
| 29 | FAILING UNIT LOCATOR | BOARD NUMBER | BD-6 |
| 30 | FAILING UNIT LOCATOR | BOARD NUMBER | —— |
| 31 | FAILING UNIT LOCATOR | BOARD NUMBER | —— |

REFRESH DIAGNOSTIC MODE WITH CLOCK ERROR

| Bit | Field | Subfield | Name |
|---|---|---|---|
| 00 | MODE | | BYTE PARITY |
| 01 | MODE | | REFRESH |
| 02 | REFRESH GO COUNT (RGC) | | RGC-OVERFLOW |
| 03 | REFRESH GO COUNT (RGC) | | RGC-8 |
| 04 | REFRESH GO COUNT (RGC) | | RGC-4 |
| 05 | REFRESH GO COUNT (RGC) | | RGC-2 |
| 06 | REFRESH GO COUNT (RGC) | | RGC-1 |
| 07 | ERROR FIELD | DATA OUT ERROR | SINGLE-BIT |
| 08 | ERROR FIELD | DATA OUT ERROR | MULTI-BIT |
| 09 | ERROR FIELD | DRE | DRIVER |
| 10 | ERROR FIELD | ADDRESS IN ERROR (AIE) | AIE-1 |
| 11 | ERROR FIELD | ADDRESS IN ERROR (AIE) | AIE-2 |
| 12 | ERROR FIELD | ADDRESS IN ERROR (AIE) | AIE-3 |
| 13 | ERROR FIELD | MKE | MASK |
| 14 | ERROR FIELD | DATA IN ERROR (DIE) | DIE-0 |
| 15 | ERROR FIELD | DATA IN ERROR (DIE) | DIE-1 |
| 16 | ERROR FIELD | DATA IN ERROR (DIE) | DIE-2 |
| 17 | ERROR FIELD | DATA IN ERROR (DIE) | DIE-3 |
| 18 | ERROR FIELD | DATA IN ERROR (DIE) | DIE-4 |
| 19 | ERROR FIELD | DATA IN ERROR (DIE) | DIE-5 |
| 20 | ERROR FIELD | DATA IN ERROR (DIE) | DIE-6 |
| 21 | ERROR FIELD | DATA IN ERROR (DIE) | DIE-7 |
| 22 | FAILING UNIT LOCATOR | BLOCK | ADD-11 |
| 23 | FAILING UNIT LOCATOR | BLOCK | ADD-12 |
| 24 | FAILING UNIT LOCATOR | BOARD NUMBER | BD-1 |
| 25 | FAILING UNIT LOCATOR | BOARD NUMBER | BD-2 |
| 26 | FAILING UNIT LOCATOR | BOARD NUMBER | BD-3 |
| 27 | FAILING UNIT LOCATOR | BOARD NUMBER | BD-4 |
| 28 | FAILING UNIT LOCATOR | BOARD NUMBER | BD-5 |
| 29 | FAILING UNIT LOCATOR | BOARD NUMBER | BD-6 |
| 30 | FAILING UNIT LOCATOR | BOARD NUMBER | —— |
| 31 | FAILING UNIT LOCATOR | BOARD NUMBER | —— |

REFRESH DIAGNOSTIC MODE

| Bit | Field | Subfield | Name |
|---|---|---|---|
| 00 | MODE | | BYTE PARITY |
| 01 | MODE | | REFRESH |
| 02 | REFRESH GO COUNT (RGC) | | RGC-OVERFLOW |
| 03 | REFRESH GO COUNT (RGC) | | RGC-8 |
| 04 | REFRESH GO COUNT (RGC) | | RGC-4 |
| 05 | REFRESH GO COUNT (RGC) | | RGC-2 |
| 06 | REFRESH GO COUNT (RGC) | | RGC-1 |
| 07 | ERROR FIELD | DATA OUT ERROR | SINGLE-BIT |
| 08 | ERROR FIELD | DATA OUT ERROR | MULTI-BIT |
| 09 | ERROR FIELD | DRE | DRIVER |
| 10 | ERROR FIELD | ADDRESS IN ERROR (AIE) | AIE-1 |
| 11 | ERROR FIELD | ADDRESS IN ERROR (AIE) | AIE-2 |
| 12 | ERROR FIELD | ADDRESS IN ERROR (AIE) | AIE-3 |
| 13 | ERROR FIELD | MKE | MASK |
| 14 | ERROR FIELD | DATA IN ERROR (DIE) | DIE-0 |
| 15 | ERROR FIELD | DATA IN ERROR (DIE) | DIE-1 |
| 16 | ERROR FIELD | DATA IN ERROR (DIE) | DIE-2 |
| 17 | ERROR FIELD | DATA IN ERROR (DIE) | DIE-3 |
| 18 | ERROR FIELD | DATA IN ERROR (DIE) | DIE-4 |
| 19 | ERROR FIELD | DATA IN ERROR (DIE) | DIE-5 |
| 20 | ERROR FIELD | DATA IN ERROR (DIE) | DIE-6 |
| 21 | ERROR FIELD | DATA IN ERROR (DIE) | DIE-7 |
| 22 | REFRESH FIELD | MODE | MR/NBR |
| 23 | REFRESH FIELD | MODE | SSR |
| 24 | REFRESH FIELD | Y—COUNTER | Y-16 |
| 25 | REFRESH FIELD | Y—COUNTER | Y-8 |
| 26 | REFRESH FIELD | Y—COUNTER | Y-4 |
| 27 | REFRESH FIELD | Y—COUNTER | Y-2 |
| 28 | REFRESH FIELD | Y—COUNTER | Y-1 |
| 29 | REFRESH FIELD | Y—COUNTER | —— |
| 30 | REFRESH FIELD | Y—COUNTER | —— |
| 31 | REFRESH FIELD | Y—COUNTER | —— |

FIG. 2

AVAILABILITY AND DIAGNOSTIC APPARATUS FOR MEMORY MODULES

BACKGROUND OF THE INVENTION

1. Field of the Invention

This invention relates generally to memory modules used in conjunction with a data processing unit and more particularly to apparatus for the identification and utilization of error information affecting the integrity of the data processed in the memory module. The error information is used to locate defective apparatus and to establish the availability of the components of the memory module to the data processing unit.

2. Description of the Prior Art

Errors originating in memory modules associated with a data processing unit have typically been detected and diagnosed under the direct control of the central processing unit. Recently however, semiconductor elements, particularly elements utilizing metal-oxide-semiconductor (MOS) techniques, have been adapted for use in memory modules. The use of semiconductor memory elements, because of the volatile nature of the storage mechanism, greatly enhances the complexity of the apparatus associated with memory element arrays of the module. It is necessary for example to restore (or refresh), by the activation of appropriate circuits, the charge stored in the semiconductor element periodically to prevent the loss of binary information stored therein. Similarly, a read or write operation requires additional electrical manipulation of the semiconductor element in order to deposit or extract the binary information. Each additional electrical activity of the semiconductor element enhances the opportunity for introducing spurious binary signals signals into the memory module. In addition, the increased complexity of the associated circuitry, required to perform the electrical manipulation, enlarges the number of components in which a deleterious malfunction may occur.

In an effort to increase the integrity of the binary information in the relatively noisy media, it is known in the prior art to use Error Correcting Code (ECC) apparatus. (cf. Error-Correcting Code, W. Wesley Peterson and E. J. Weldon Jr., M.I.T. Press Cambridge 1972). The ECC apparatus provides data bits, related to data in such a manner that, for certain types of errors, not only is the presence of an error introduced at a later time detected, but the location of the error in the data base is derivable and therefore correctable. Thus ECC Apparatus is included with the semiconductor element array to enhance the integrity of the stored information.

The operation of the ECC apparatus, in correcting errors generated in the memory array conceals from the data processing unit, the deterioration, either gradual or abrupt, of that portion of the semiconductor element array, or associated circuitry and a method for the review of the operation of the ECC apparatus by the data processing is required. On the other hand, while the ECC apparatus is functioning to correct an occasional spurious error, performing elaborate diagnostic procedures upon detection of the error is not only unnecessary, but fruitless. It is desirable to differentiate between recurring errors and an occasional random error.

In the semi-conductor element array, certain circuit malfunctions are so important as to jeopardize the accuracy of large portions of the data related thereto and render operation of the ECC apparatus pointless. Such a circuit malfunction must take priority over detection of other error-generating circuits for which the ECC apparatus provides a satisfactory remedy. In the memory arrays of semi-conductor elements, the driver or clock circuits perform the fundamental element manipulation for large groups of array elements. It is essential that immediate detection of a malfunction of these driver circuits be provided. Either the circuit is corrected rapidly, or else, that part of the memory array is rendered unavailable for use by the data processing unit.

The refresh apparatus (i.e., the circuits for the restoration of the volatile information contained in the semiconductor elements) also affects large portions of the data. Thus it is essential that the refresh apparatus functions correctly if the memory module is to perform satisfactorily. However, it is frequently difficult to separate malfunctions of the logic circuits governing the refresh operation from the circuits (such as the driver circuits) which actually perform the refresh operation (such as the driver circuits). Therefore it is desirable to provide a separate method of checking the logic circuits controlling the refreshing of information stored in the semiconductor elements.

It is also desirable that provision be made for situations where information containing errors is delivered to the memory module by the data processing unit. In this case, the data processing unit must be informed of the presence of the error and nature of the error. Sufficient information must also be obtained to permit the data processing unit to localize the source of the error, to the extent possible, from the available information.

The capacity of the main memory required by a data processing unit can dictate that more than one memory module is desirable. To minimize the restructuring of the system, it is desirable that the equipment for storing error information is made an integral part of each memory module. Furthermore, the disposition of the maintenance and availability apparatus in each memory module results in a net reduction of interconnections between the memory module and the data processing unit. A certain amount of analysis can be performed by that apparatus minimizing the information that must be returned to the data processing unit.

It is therefore an object of the present invention to provide an improved memory module associated with a data processing unit.

It is further an object of the present invention to provide maintenance and availability apparatus for identifying and storing information concerning errors originating in a memory module.

It is a further object of the present invention to deliver to the data processing unit the information stored in the maintenance and availability apparatus concerning errors associated with the memory module in order that the data processing unit responds in a manner appropriate to the severity of the detected malfunction.

It is a still further object of the present invention to establish a hierarchy of error information to be reported to the data processing unit so that identification of the most serious errors receives appropriate priority.

Another object of the present invention is to provide apparatus for the automatic checking of the logic circuit controlling the refresh operation of a memory module contained in memory elements storing volatile information.

It is a more particular object of the present invention to store information relating to the operation of the ECC apparatus to determine if there is a deterioration in the performance of an element of the semiconductor array and to localize the malfunctioning element.

Another object of the present invention is to provide diagnostic and availability information to the data processing unit to minimize the effect of errors associated with deteriorating memory elements on the data processing operation.

Still another object of the present invention is to detect and record error information concerning data entering the memory module for transmission to the data processing unit.

SUMMARY OF THE INVENTION

The aforementioned and other objects of the present invention are accomplished by providing a maintenance status register and associated apparatus for manipulation and storing of information involving errors detected in the memory module associated with a data processing unit. Errors detected in the memory module are entered in prescribed positions of the maintenance status register. The presence and nature of a detected error is signalled to the data processing unit, which responds in a manner appropriate to the nature of the error. The data processing unit has access to the contents of the maintenance status register in order to localize the malfunction and determine the availability of the memory module.

Information contained in the maintenance status register allows the data processing unit to determine whether the ECC apparatus is correcting for an occassional error or is continuously correcting for a deteriorating element in the memory module. The maintenance status register operates so that information concerning a malfunction of a driver circuit, critical to large portions of data, supercedes other information.

The maintenance status register records information concerning parity errors in incoming data delivered to the memory module by the data processing unit. The incoming error information specifies the group of data for which an error was identified.

Another mode of operation is provided by the invention wherein the logic circuits associated with the apparatus for the refreshing of the volatile data contained in the memory elements. The present invention verifies the operation of the logic circuits under control of the data processing unit. Information identifying a driver circuit error also supercedes verification of the logic circuits in this mode of operation.

These and other features of the invention will be understood upon reading the following description together with the drawings.

BRIEF DESCRIPTION OF THE DRAWINGS

FIG. 2 displays the definition of the 32 locations of the Maintenance Status Register in the ECC/Byte Parity Mode, with and without the occurrence clock error, and further displays the definition of the Maintenance Status Register in the Refresh Diagnostic Mode with and without the occurrence of a clock error.

DESCRIPTION OF THE PREFERRED EMBODIMENT

DESCRIPTION OF THE APPARATUS

Figure 1:
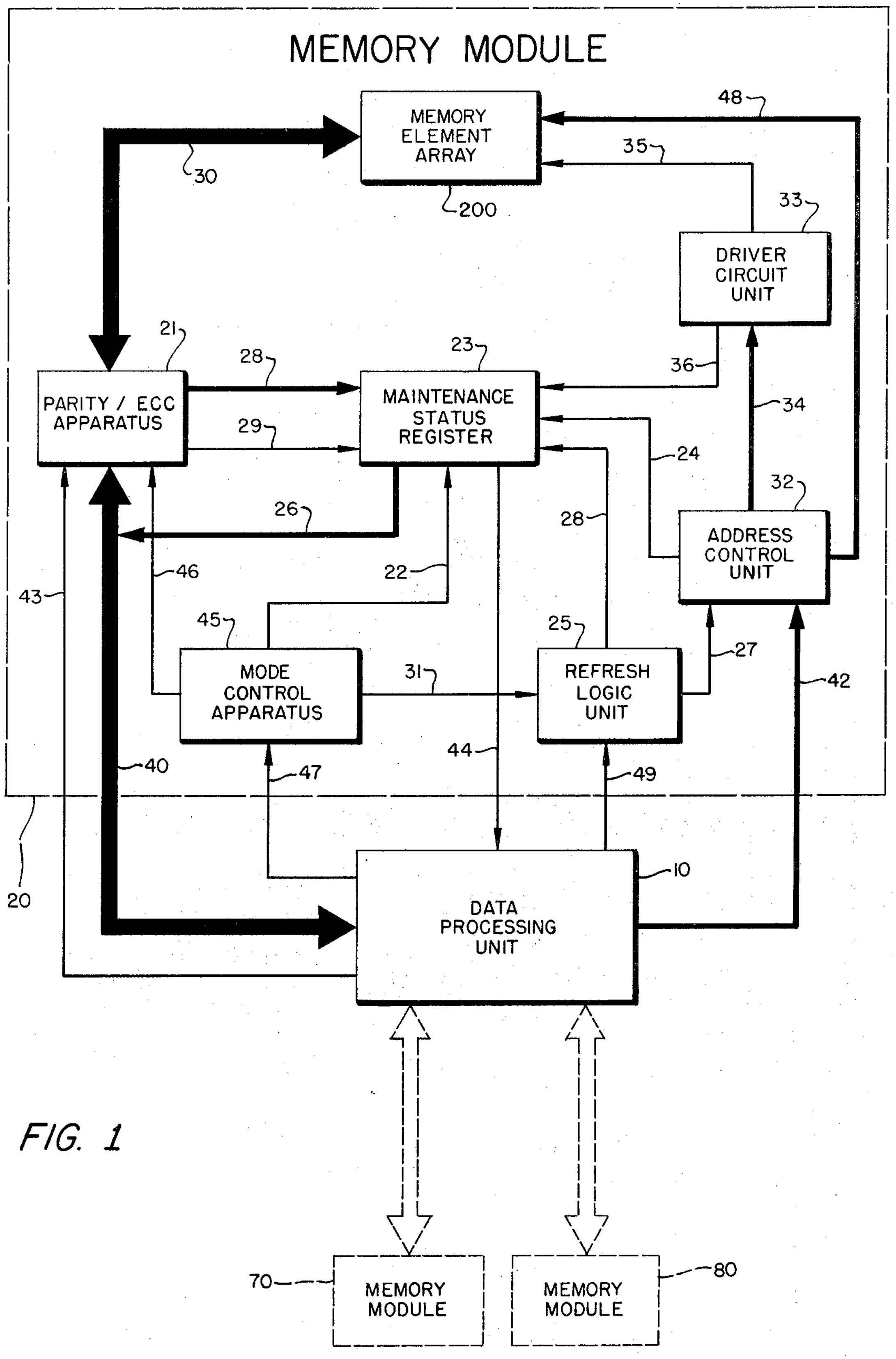
FIG. 1 is a block diagram showing the relationship between the data processing unit, the elements of the memory module, and the Maintenance Status Register.

Referring now to FIG. 1, the Data Processing Unit 10 causes information in the form of binary data bits to be delivered to or retrieved from Memory Module 20. The transfer of information takes place via Main Data Bus 40, which is coupled between the Memory Module 20 and the Data Processing Unit 10. In the preferred embodiment, the Main Data Bus consists of 72 Channels for transferring the binary data, arranged in 8 bytes of 8 data bits and one parity bit each, however other arrangements are possible. The operation of a single Memory Module 20 is discussed in detail, however the invention applies equally to the operation of a plurality of memory modules such as Memory Module 70 and Memory Module 80, provided that conventional apparatus limiting access to the undesired module or modules during appropriate periods is supplied.

Main Data Bus 40 is coupled internally in Memory Module 20 to Parity/ECC Apparatus 21. The Parity/ECC Apparatus 21 checks the parity of data (i.e., the one parity bit per byte in the preferred embodiment) coming from the Data Processing Unit 10. During normal operation, the Parity/ECC Apparatus 21 then encodes the data, replacing the parity bits with ECC check bits, and delivers the ECC encoded data to the appropriate location in Memory Element Array 220 via Data Bus 30.

Similarly, for data to be transferred to the Data Processing Unit 10 from the Memory Element Array 200, encoded data from the appropriate location in the Array 200 is delivered via Data Bus 30 to the Parity/ECC Apparatus 21. In Apparatus 21 the data is corrected, if necessary, and provided with proper byte parity bits, and delivered to the Main Data Bus 40 for transfer to Data Processing Unit 10.

Under appropriate conditions, the Parity/ECC Apparatus 21 can also operate to check the parity bits of the incoming data and consequently store the incoming data (with parity bits) in Memory Element Array 200 without replacing the parity bits with ECC check bits. The Parity/ECC Apparatus 21 can also permit data from the Data Processing Unit 10 to be stored in Memory Element Array 200 without parity verification or generation of ECC check bits. Operation of the Parity/ECC Apparatus 21 is determined by signals from Mode Control Apparatus 45 applied to Apparatus 21 via Bus 46. The Mode Control Apparatus 45 is controlled by signals from the Data Processing Unit 10 applied via Bus 47.

Data Bus 28 and Control Line 29 are also coupled between Parity/ECC Apparatus 21 and Maintenance Status Register 23. Control Line 29 signals to the Maintenance Status Register 23 the identification of a Data-In error in the parity of the data of the Main Data Bus 40, a single error in ECC encoded data extracted from the Memory Element Array 200 or a multiple error in the ECC encoded data extracted from Array 200. In single error correction of ECC encoded data, the syndrome bits (i.e., bits developed in the ECC technique which specify the bit group error location) or, in the case of a Data-In error, bits specifying the location of the particular byte containing the parity error detected by the Parity/ECC Apparatus 21 are supplied to Maintenance Status Register via Bus 28.

The Data Processing Unit 10 is further coupled, by Address Bus 42, to the Address Control Unit 32 of Memory Module 20. In the preferred embodiment Address Bus 42 contains 22 channels, divided in three groups each containing one parity checking channel. When the location of the desired elements of the Memory Elements Array 200 is delivered to the Address Control Unit 32, the parity of each of the three groups is checked, and the occurrence of an error, along with the identification of the address bit group containing the error, is signaled to the Maintenance Status Register 23 via Bus 24. The Address Control Unit 32 is coupled to Memory Element Array 200 by Bus 48. Signals on Bus 48 determine the particular memory elements being addressed in Memory Module 20.

Address Control Unit 32 is coupled to Driver Circuit Unit 33 via Bus 34. Driver Circuit Unit 33 is coupled to the Memory Element Array 200 via Bus 35. In the preferred embodiment, the Driver Circuits are physically located on the board with associated semiconductor memory elements. The separation shown in FIG. 1 illustrates the separation of functions. The activation of the appropriate Driver (or Clock) circuits is determined by the data signals on the Address Bus 42. The address signals and additional control signals, which are not shown, activate the Driver Circuit manipulating a group of memory elements in Array 200 including the addressed memory elements. A malfunction in the operation of any of the Driver Circuits of Unit 33 is signaled, along with the location of the malfunctioning unit to Maintenance Status Register 23 via Bus 36.

The Parity/ECC Apparatus 21 is further coupled to Data Processing Unit 10 by Mask Bus 43, which provides the Parity/ECC Apparatus 21 with information concerning the masking of certain portions of the data word. The data delivered by Mask Bus 43 contains one parity bit. This parity bit is compared with a parity bit generated by the Parity/ECC Apparatus 21 from the incoming data and an error is signaled to the Maintenance Status Register 23 via Bus 29. For an implementation of parity/ECC apparatus similar to Parity/ECC Apparatus 21, see the patent issued to Kolankowsky on Apr. 6, 1971 entitled "Memory With Error Correction for Partial store operation."

The Refresh Logic Unit 25 contains apparatus to activate the restoration of information stored in the semiconductor elements of the Memory Element Array 200. The Refresh Logic Unit 25 is coupled to Address Control Unit 32 via Bus 27 and determines which group of semiconductor elements of the Memory Element Array will be refreshed as well as when the restoration will take place. Bus 28 is coupled to the Maintanance Status Register 23 for supplying information described below to determined a circuit malfunction in the Refresh Logic Unit 25. The Refresh Logic Unit is controlled in part by signals from the Data Processing Unit 10 via Control Bus 49. Control Bus 49 provides signals (such as the Input/Output Reservation Signal, IOCRES,) necessary for the operation of the Memory Module 20. The Mode Control Apparatus 45 is coupled to Refresh Logic Unit 25 via Bus 31 and controls the mode of operation of the Refresh Logic Unit.

The mode of operation of the Memory Module is established by the Mode Control Apparatus 45, which in turn, is controlled by signals delivered via Control Bus 47 from the Data Processing Unit. In the preferred embodiment, Bus 47 comprises three channels. The Mode Control Apparatus 45 decodes the signals placed on Bus 47 and delivers signals to appropriate parts of Memory Module 20 by means known in the prior art. See, for example, the decoding circuits described in Chu, *Digital Computer Design Fundamentals* (McGraw Hill 1962) at 317–320. The following modes of operation are available in the preferred embodiment:

1. Normal ECC Mode
2. Set ECC By pass
3. Diagnostic Read
4. Input Error Override
5. Must Refresh/Non-Busy Refresh Diagnostic Set
6. Self-Start Refresh Diagnostic Set
7. Reset to Normal ECC Mode. The state of the Mode Control Apparatus 45 is signaled to the Maintenance Status Register 23 via Bus 22.

The Normal ECC Mode, in a write operation, provides for checking the parity check bits with the corresponding bytes for an incoming data word and replacing the parity check bits with ECC check bits in Parity/ECC Apparatus 21. The resulting ECC check bits and data bytes are stored in the addressed location in Memory Element Array 200. In the read operation in the Normal ECC Mode, the ECC check bits and data bytes are extracted from the addressed location in the Memory Element Array 200, the data bytes are corrected if necessary, and the ECC check bits ar replaced by parity check bits for each data byte. The complete data word is delivered to the Data Processing Unit 10.

The Set ECC Bypass Mode in the Write operation, causes the Parity/ECC Apparatus 21 to compare the parity check bits with the corresponding byte for an incoming data word, and, if correct, to store the data word in the addressed location of Memory Element Array 200 without replacing parity check bits with the ECC check bits. In the read operation, the data word at the addressed location is delivered directly to the Data Processing Unit 10.

The Diagnostic Read Mode causes the contents of the Maintenance Status Register 23 to be placed on Data Bus 40 for manipulation by Data Processing Unit 10. To accomplish this transfer, Data Bus 26 is coupled between the Main Data Bus 40 and the Maintenance Status Register 23.

The Input Error Override Mode causes a data word to be written into from Memory Element Array 200 without a parity check. However parity checks are performed on the mask signals and the address signals in the preferred embodiment.

The Must Refresh/Non-Busy Diagnostic Set Mode causes linary logic signals to be set in appropriate locations in the Maintenance Status Register 23 to indicate that one of the two Refresh Diagnostic Modes is set in the Memory Module 20 and, separately, to indicate that either the Must Refresh or the Non-Busy Refresh Logic Circuits of Refresh Logic Unit 25 are being tested. The Self-Start Refresh Diagnostic Mode causes binary logic signals in appropriate locations in the Maintenance Status Register 23 to indicate both a Refresh Diagnostic Mode and the fact that the Self-Start Refresh Logic Circuits of the Refresh Logic Unit 25 are being tested. Refresh Logic Unit 25 contains a Must Refresh Logic Circuit, a Non-Busy Refresh Logic Circuit, and a Self-Start Refresh Logic Circuit. The use of the three Refresh Logic Circuits and their respective functions can be understood by reference to the copending application Ser. No. 215,736, filed Dec. 29, 1971, entitled "Technique for Refreshing MOS Memories," and assigned to the assignee of the present invention.

The Reset to Normal ECC Mode sets the elements in the Maintenance Status Register 23 and the remainder of the Memory Module 20 to allow the Memory Module 20 to the Normal ECC Mode of Operation.

Imposing either of the two Refresh Diagnostic Set Modes or the Diagnostic Read Mode clears the contents of the Maintenance Status Register thereby eliminating data which is not relevant to the succeeding operation of the Memory Module.

The Maintenance Status Register 23 is also coupled to the Data Processing Unit 10 by Bus 44 which signals that an error has been recorded by the Maintenance Status Register 23. In the preferred embodiment Bus 44 comprises four channels. The first channel signals a Single-Bit Error Correction and occurs only during the first count (i.e., after clearing) in the Maintenance Status Register 23, this signal indicates the correction of data by the Parity/ECC Apparatus 21. The second channel indicates to the Data Processing Unit 10 that a Write Operation in the Memory Element Array 200 has been cancelled because of an Address-In Parity Error, Mask-In Parity error, Data-In Parity error or an internally generated write error. The third channel indicates, to the Data Processing Unit 10, the occurrence of a retryable error such as an Address-In Parity error, Mask-In Parity error, Data Parity Error, or an internally generated write. The fourth channel indicates the occurrence of a non-retryable error in the Driver Circuit Unit 33.

Referring next to FIG. 2, the definition of each of the 32 bit positions of the Maintenance Status Register, according to the preferred embodiment, are given. Position 00 displays a binary one logic signal when the Set ECC Bypass Mode is state present in the Mode Control Apparatus 45. Position 01 stores a binary 1 logic signal when either the Must Refresh Non-Busy Refresh Mode or Self-Start Refresh Mode is present in the Mode Control Apparatus 45.

Position 03, 04, 05 and 06 of the Maintenance Status Register are coupled to the terminals of a four-bit counter and designate the number stored in the counter. The counter will freeze on 16 counts until cleared by one of the signals described above which clear the data contained in the Maintenance Status Register. Position 02 contains a positive binary logic signal when the number of counts delivered to the Maintenance Status Register, after a clearing operation, reaches 4091, and this count will remain in the Register 23 until a clearing operation takes place. A count is delivered to the counter and therefore to the Maintenance Status Register each time the Parity/ECC Apparatus operates to correct data stored in the Memory Element Array, when position 00 contains a negative binary signal. When position 01 contains a positive binary signal a count is delivered to the Register 23 ech time the Refresh Logic Unit 25 delivers a Refresh Go (RGO) signal. The Refresh Go (RGO) signal is generated by the Refresh Logic Unit 25 to initiate the refresh cycle for a group of elements in Memory Element Array 200.

Position 07 of the Maintenance Status Register stores a positive binary logic signal following the correction, by the Parity/ECC Apparatus of the first Signal-Bit error in the stored data, after the Maintenance Status Register has been cleared. This signal remains stored until the Maintenance Status Register 23 is cleared. Position 08 contains a positive binary logic signal after a Multi-Bit error has been detected in the stored data. Position 09 contains a positive binary logic signal when the Driver Circuit Unit 33 establishes the occurrence of a malfunction.

Positions 10, 11, or 12, of Maintenance Status Register 23, contain a positive binary logic signal when an error is detected in the comparison between the parity bit and the data of the corresponding one of the three groups of Address-In Data Signals. Position 13 contains a positive binary logic signal when a parity check of the Mask-In Data discloses an error. Positions 14, 15, 16, 17, 18, 19, 20 or 21 contain a positive logic signal when a parity check performed in the Parity/ECC Apparatus 21 determines that the incoming byte data corresponding to that Maintenance Status Register position, is inconsistent with the accompanying parity bit.

Positions 22 through 31 contain binary logic signals which depend both upon the status of position 01 of the Maintenance Status Register 23 and upon the occurrence of a Driver Circuit error in Driver Circuit Unit 33. Regardless of the status of position 01, detection of a Driver Circuit error will place binary logic signals in position 22 and/or position 23 which identifies the one of four blocks of boards containing the Driver Circuit malfunction. Positions 25 through 29 contain logic signals which further localize the error to the one of six boards contained in that block of boards. In the absence of a positive logic signal in position 01 and in the absence of a Driver Circuit Error, positions 22 and 23 contain binary information identifying the block of boards storing the data which the Parity/ECC Apparatus 21 corrected through ECC techniques. Positions 24 through 31 contain the syndrome bits from the ECC correction apparatus, which allows the localization of the faulty data bit. Positions 24 through 31 contain the data for the most recent correction of data by the Parity/ECC Apparatus 21 and the information after each correction is overlaid on the previous data. However, when position 01 contains a positive binary logic signal and no Driver Circuit error has occurred, either position 22 or position 23 contains positive binary logic signal determined by which portion of the Refresh Logic Unit 25 is being tested, i.e., the Must Refresh Non-Busy Refresh Circuits or the Self-Start Refresh Circuits. Positions 24 through 28 contain the output of a Y-Counter of the Refresh Logic Unit which identifies the one section out of thirty-two into which the Memory Element Array 200 has been divided, that is being addressed by the Refresh Logic Unit 25 during the diagnostic procedure.

Figure 3:
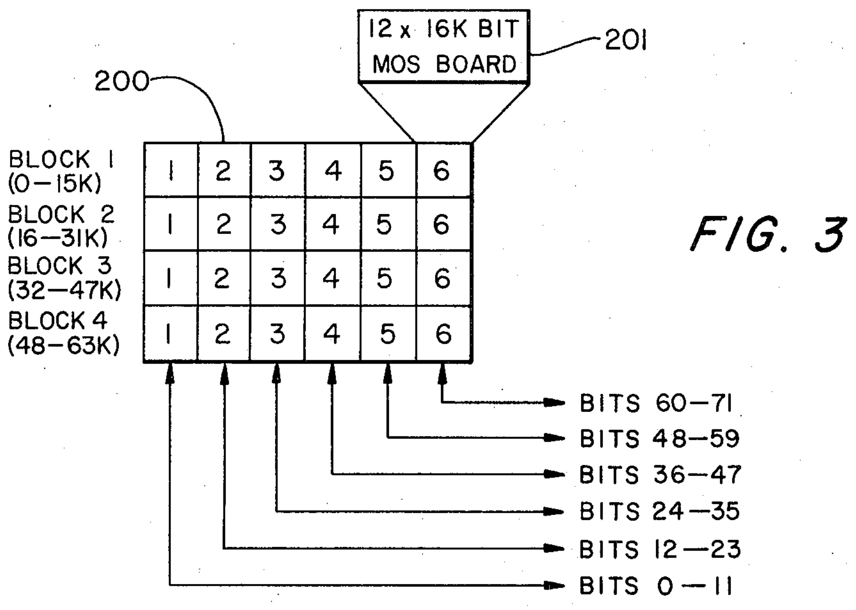
FIG. 3 shows the arrangement of boards containing the semi-conductor elements in the preferred embodiment.

Referring next to FIG. 3, a schematic view of the Memory Element Array 200 is shown in which 12 × 16k semiconductor memory elements are mounted on a typical MOS Board 201. Six boards are contained in one block and the Memory Module contains four blocks. The memory contains 64k of addressable words, each word containing 72 binary bits of information.

The apparatus comprising the element Maintenance Status Register 23 is shown in FIGS. 4A, 4B, 4C and 4D. Each figure demonstrates the implementation according to the preferred embodiment for a similar group of Register positions.

Figure 4C:
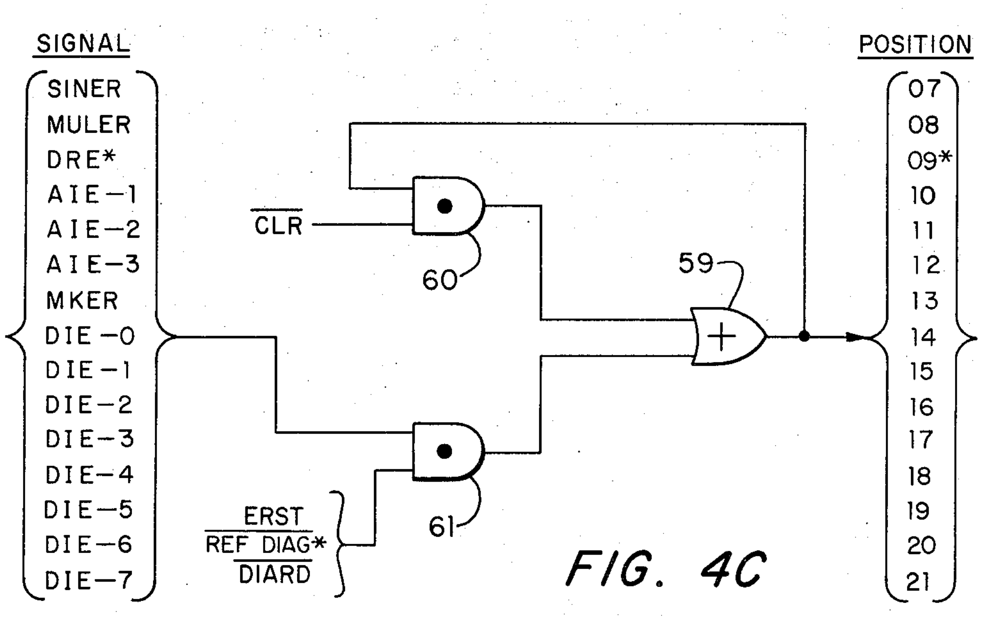
FIG. 4C displays the circuit diagrams of the Error Field Units of the Maintenance Status Register.
Figure 4A:
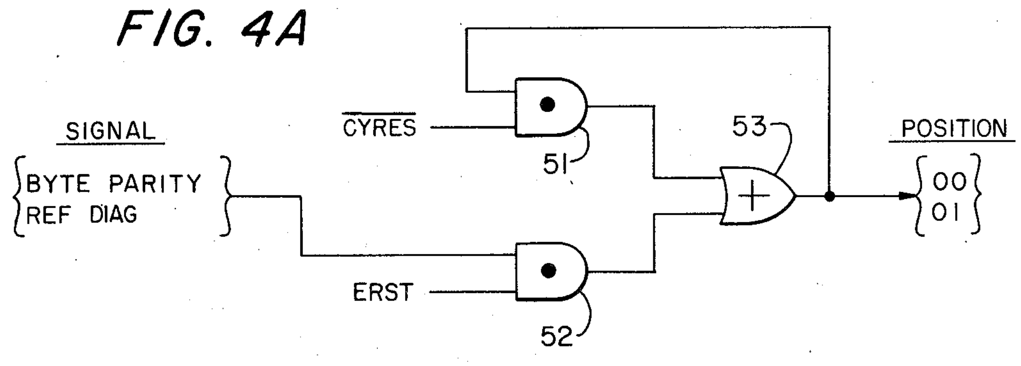
FIG. 4A displays the circuit diagrams of the Mode Field Units of the Maintenance Status Register.

Referring to FIG. 4A, the positions 00 and 01 of Register 23 are implemented by two circuits. These circuits comprise a logic OR gate 53, a logic AND gate 51 and a logic AND gate 52. The output terminal of logic AND gate 51 is coupled to an input terminal of logic "OR" gate 53. One input terminals of logic "AND" gate 51 is coupled to the output terminal of logic OR gate 53, providing the recirculation or latching for a positive logic signal at that position. The second input terminal of logic AND gate 51 is coupled to a $\overline{\text{CYRES}}$ signal. The Cycle Reset, $\overline{\text{CYRES}}$, signal is a reset pulse generated at the end of each Memory Module 20 cycle in the preferred embodiment. The generation of the Cycle Reset Signal causes $\overline{\text{CYRES}}$ to become a binary logic 0 signal, thereby breaking the recirculation or latch of the positive binary logic signal of the output of logic gate 53. The output terminal of logic AND gate 52 is coupled to an input terminals of logic OR gate 53. On input terminal of logic AND gate 52 is coupled to an Error Strobe (ERST) signal, which is a positive logic signal produced for actuating appropriate gates, thereby recording the occurrence of errors. The circuit associated with position 00 has the Byte Parity Mode signal coupled to the input terminal of logic AND gate 52. The circuit associated with position 01 has the Refresh Diagnostic (REFDIAG) i.e., either the Must Refresh/Non-Busy Refresh Diagnostic Set signal or the Self-Start Diagnostic Set signal from the Mode Control Apparatus 45 coupled to the input terminal of logic gate 52.

Figure 4B:
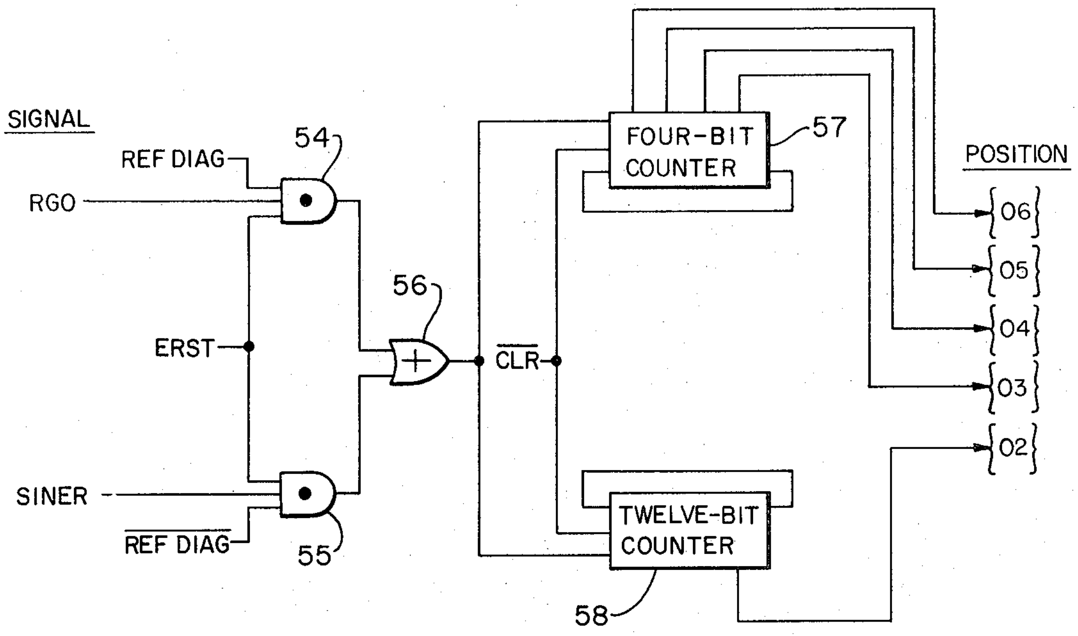
FIG. 4B displays the circuit diagrams of the Corrected Error Count/Refresh Go Field Units of the Maintenance Status, Register.

Referring next to FIG. 4B, the Maintenance Status Register positions 03 through 06 are coupled to the output terminals of Four-Bit Counter 57, while position 02 is coupled to the final terminal of Twelve-Bit Counter 58. Each counter has a feedback loop to freeze the count at the maximum value, when attained. The $\overline{\text{CLR}}$ signal clears the counters. The clear, $\overline{\text{CLR}}$, signal is generated at the end of a Diagnostic Read (DIARD) signal, causing the contents of Maintenance Status Register 23 to be applied to Bus 40, or a System-Initialize (SYSIN) Signal used for initialization in the preferred embodiment.

Referring next to FIG. 4c, the implementation of the Maintenance Status Register positions 07 through 21 according to the preferred embodiment is shown. Each position comprises a logic OR gate 59, a logic AND gate 60 and a logic AND gate 61. The output terminals of logic gate 60 and logic gate 61 are coupled to input terminals of logic gate 59. One input terminal of logic AND gate 60 is coupled to an output terminal of gate 59, providing a recirculation or latching path, while a second terminal of logic AND gate 59 receives the $\overline{\text{CLR}}$ signal for breaking the latch and clearing the register. The input terminals of logic AND gate 61 receives the ERST, $\overline{\text{REFDIAG}}$ and $\overline{\text{DIAGRD}}$ (Diagnostic Read) signals. In addition, the logic AND gate 61, associated with each Register position is coupled to a data signal. Corresponding to position 07, gate 61 receives the SINER signal from the Parity/ECC Apparatus; corresponding to position 08, a MULER (Multiple Error) signal from the Parity/ECC Apparatus; corresponding to position 09, a DRE (Driver Circuit Error) signal when any Driver Circuit malfunctions, however the asterisks indicate that for this poriton the $\overline{\text{REFDIAG}}$ signal is not applied to AND gate 61; corresponding to position 10, an AIE-1 (Address-In Error signal from Address Control Unit 32 for the first group of Address-In signals) signal from the Address Control Unit 32; corresponding to position 11, an AIE-2 (Address-In Error signal for the second group) signal; corresponding to position 12, an AIE-3 (Address-In Error Signal from the final group) signal; corresponding to position 13, an MKER (Mask Error) signal from the Parity/ECC Apparatus 21; corresponding to position 14, a DIE-0 (Data-In Error signal for the first data byte) signal from Parity/ECC Apparatus 21; and, corrsponding to position 14 through 21; DIE-1 through DIE-7 (Data-In Error signals for data bytes 2 through 8) signals from Parity/ECC Apparatus 21.

Figure 4D:
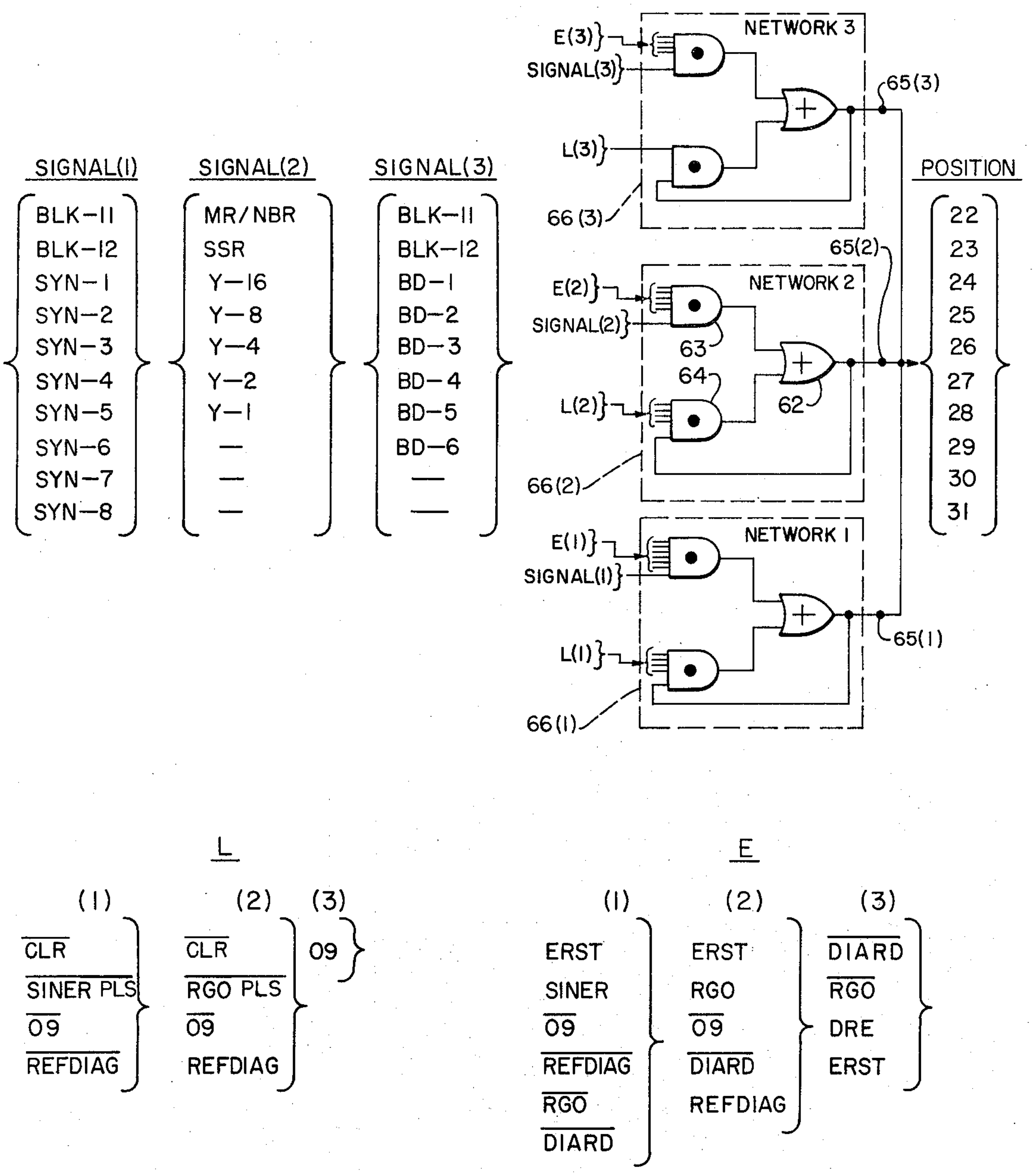
FIG. 4D displays the circuit diagram of the Failing Unit Locator Field Elements of the Maintenance Status Register.

Referring next to FIG. 4D, the schematic diagram of apparatus implement positions 22 through 31 of Maintenance Status Register 23 is shown. Each position is comprised of three networks with the output terminals 65 coupled together. The input signals to the three networks 66 determine the resulting output signal.

Network 66 comprises logic OR gate 62 and logic AND gates 63 and 64. An output terminal of OR gate 62 is coupled to an input terminal of AND gate 64. An output terminal of AND gate 64 is coupled to an input terminal of OR gate 62, while a second input terminal of OR gate 62 is coupled to an output terminal of AND gate 63. The remaining input terminals of AND gate 64 are adapted to receive a group of signals L(1), L(2) or L(3). A series of signals, E(1), E(2) or E(3) enabling the appropriate circuits, are coupled to input terminals of gate 63, while a remaining terminal of gate 63 is coupled to signal from an appropriate group of signals, Signal (1), Signal (2), or Signal (3) providing error-localizing information for the particular mode of operation under investigation.

For the mode of operation of Register 23 storing information localizing errors corrected by the ECC Apparatus, the first group of signals, Signal (1) are used. BLK-11 and BLK-12 signals from the Address Control Unit designate the one of four blocks, in which the error occurred, syndrome data bits SYN-1 through SYN-8 localize the error in the data group. These data bit signals are provided by the ECC Apparatus. The enabling signals E(1) coupled to Network 66(1) are ERST, SINER, $\overline{\textbf{09}}$, (09 indicates the latched DRE output signal or Maintenance Status Register 23 position 09), $\overline{\text{REFDIAG}}$, $\overline{\text{RGO}}$ and $\overline{\text{DIARD}}$. The latch portion of the network is coupled to the signals $\overline{\text{REFDIAG}}$, $\overline{\textbf{09}}$, $\overline{\text{CLR}}$ and $\overline{\text{SINERPLS}}$, where the single error pulse (SINERPLS) signal is a pulse generated at the SINER signal for clearing the present contents of this portion of the Maintenance Status Register 23. In the preferred embodiment, the SINERPLS signal is implemented by logic elements, however other techniques can be used for overlaying updated data in the elements of the Maintenance Status Register 23.

In the Refresh Diagnostic Mode, the signals, Signal (2), are to be entered in appropriate elements of Maintenance Status Register 23 are coupled to gate 63 of Network 66(2). The MR/NBR and SSR signals are mode signals originating in Mode Control Apparatus 45. The signals Y-1, Y-2, Y-4, Y-8 and Y-16 are the contents of a counter associated with Refresh Logic Unit 25. These counter contents identify one of 32 groups of memory elements being refreshed on the current RGO signal. The enabling signals E(2) for the signal (2) are, ERST, RGO, $\overline{\textbf{09}}$, REFDIAG and $\overline{\text{DIARD}}$. The latching signals L(2) for REFDIAG, $\overline{\textbf{09}}$, $\overline{\text{RGOPLS}}$ and $\overline{\text{CLR}}$, the Refresh Go Pulse RGOPLS being a pulse at the being of the Refresh Go signal for clearing the contents of the appropriate elements of Maintenance Status Register 23. Other methods of overlaying updated data can be used.

The signals, Signals (3), provide information localizing the Driver Circuit Unit 33 errors. BLK-11 and BLK-2n signals from the Address Control Unit 32 designate the one of four blocks in which the malfunction occurred. Data BD-1 through BD-6 indicate the particular board in the block of boards in which the malfunction occurred. The enabling signals for this group of positions comprises $\overline{\text{DIARD}}$, $\overline{\text{RGO}}$, DRE and ERST. The latching signal is for this group of information a single L(3) signal for Maintenance Status Register 23 position 09.

Other circuits and other combinations of signals may be employed in such a manner as to implement the function of the Maintenance Status Register 23 without departing from the spirit and scope of the present invention.

OPERATION OF THE PREFERRED EMBODIMENT

Upon signaling via Mode Control Apparatus 45 for a Diagnostic Read, DIARD, the contents of the Maintenance Status Register are transferred to Main Data Bus 40 for analysis by the Data Processing Unit 10. From the information the Data Processing Unit can identify and localize an error condition, and that portion of the Memory Module can be considered unavailable and/or appropriate maintenance can be initiated.

When the Failing Unit Locator Field of the Maintenance Status Register 23 contains an indication of a Driver Circuit Error, i.e., a binary one signal in position 09, the Failing Unit Locator Field contains the information localizing section of Driver Circuit Unit 33 in which the malfunction occurred. This information is overlaid on any other information in the Failing Unit Locator Field in either the Byte Parity Mode (positive binary signal in position 00) or in the Refresh Mode (positive binary signal in position 01). This priority of the Driver Circuit error information is a result of the importance of the driver circuits for the accurate operation of the memory elements. In addition a Non-Retryable Error, is signaled to the Data Processing Unit to indicate the occurrence of this module failure.

In the presence of a positive binary logic signal in position 01, the Refresh Diagnostic Modes provide for testing of portions of the Refresh Logic Unit 25 in the absence of a Driver Circuit Error. As menioned above, the Refresh Logic Unit must produce a signal RGO under three sets of conditions entitled, Must Refresh, Self-Starting Refresh and Non-Busy Refresh. The production of a RGO signal aso produces the automatic addressing of a different set of memory elements. The set of memory elements addressed is determined by a Y-counter in the Refresh Logic Unit 25, and the RGO signal advance the counter to the succeeding position thereby providing cyclic operation. To test the operation of the Refresh Logic Unit, conditions for one of the three methods of operation are applied to the Refresh Logic Unit by the Data Processing Unit. Simultaneously, a binary logic signal, corresponding to the conditions being produced, is entered in either position 22 (Must Refresh/Non-Busy Refresh Mode) or in position 23 (Self-Start Refresh Mode). One or a plurality of sets of conditions producing operation of the appropriate portion of the Refresh Logic Unit are applied and the resulting number of RGO signals generated are counted in the Maintenance Status Register 23 positions 02–06. The change in the Y-counter and the number of counts in Register 23 positions 02—06 are compared with the number of times the conditions were imposed on the Refresh Logic Units by the Data Processing Unit 10. The discrepancy in these three numbers will indicate the occurrence of an error as well as the location of the malfunctioning circuit. The circuits are tested in the preferred embodiment until all methods of operation of the Refresh Logic Unit have been tested for all positions.

When a positive binary signal is present in the Byte Parity Mode (position 01) and a Driver Circuit Error has not been identified since a clearing of the Register, (09 does not contain a positive binary signal), then the Failing Unit Locator Field contains information concerning the most recent signal Bit error which the ECC Apparatus has corrected. The first Single Bit Error correction by the ECC Apparatus causes a positive binary signal to be stored in position 07. Simultaneously, the first Single-Bit Error correction is signaled to the Data Processing Unit 10. The first Signal-Bit Error corrections and the following are counted in positions 02 through 06. Positions 03 through 06 indicate up to 16 error counts and above 16 error counts positive binary signals are stored in all positions (i.e., the counter is frozen at 16 counts). When the number of counts reaches 4096, a positive binary signal is entered in position 02, and stored until the Register is cleared. This information is used in the following manner. Data Processing Unit 10, after being signaled of the Single-Bit Error, examines the contents of the Maintenance Status Register after a suitable interval of time. Depending on the interval between the signal to the Data Processing Unit 10, the number of counts indicated by the positions 02 through 06 indicates that the ECC Apparatus is correcting either a small number of errors or a comparatively large number of errors, which indicate a degradation in performance of that portion of the memory. The Failing Unit Locator Field, containing the location of the most recent apparatus failure will statistically be more likely to register the location of the failing unit as opposed to unit producing a random spurious error. In another embodiment, the location of the first Single-Bit Error is stored in the Maintenance Status Register 23.

In this embodiment, the first error is considered to result in the propagation of succeding errors.

The remaining Error Field positions 08 and 10 through 21 have been described in detail previously.

The above description is included to illustrate the operation of the preferred embodiment and is not meant to limit the scope of the invention. The scope of the invention is to be limited only by the following claims. From the above discussion, many variations wll be apparent to one skilled in the art that would yet be encompassed by the spirit and scope of the invention.

What is claimed is:

1. A memory module for use in association with a data processing unit comprsiing: comprising:

an array of memory elements for storing logic signals;

a plurality of driver networks coupled to said memory element array for manipulation of said logic signals;

means for producing error correcting code signals for a group of said logic signals, said code signals and said logic signal group being thereafter stored in said memory element array, said error correcting means correcting an error in said stored group of logic signals determined by said stored code signals and said stored group of logic signals upon extraction from said memory element array of said stored group of logic signals and said code signals, said stored code signals and said stored group of logic signals being combined to form a group of location-identifying signals; and a maintenance status register coupled to said plurality of driver networks and said error correcting means, said maintenance status register storing first signals identifying the occurrence and location of a driver network malfunction, said maintenance status register storing second signals identifying the occurrence and said location-identifying signals of an error in said stored group of logic signal.

2. The memory module of claim 1 wherein said maintenance status register includes a means for counting signals, said maintenance status register storing the count of signals produced by correction of errors for said groups of logic signals.

3. The memory module of claim 2 further including means for detection of errors in a group of logic signals entering said memory module by means of associated parity check signals, each of said parity check signals associated with a predetermined portion of said group of logic signals, said error detecting means coupled to said maintenance status register, said maintenance status register storing third error signals identifying the occurrence and said predetermined portion containing said error in said entering group of logic signals.

4. The memory module of claim 3 further comprising:

means for addressing a preselected portion of said memory element array, said preselected portion of said memory element array determined by address data from said data processing unit, said address means coupled to said maintenance status register and said driver circuits, said address means including parity check apparatus for verification of said address data, said address means delivering at least one fifth signal for storage in said maintenance status register upon identification of an error in said address data.

5. The memory module of claim 4 further including:

refresh means for restoring said logic signals in said memory element array, said refresh means coupled to said address means and said maintenance status register, said maintenance status register storing information verifying operation of said refresh means controlled by said data processing unit.

6. The memory module of claim 5 wherein said maintenance status register is comprised of a plurality of semiconductor element storage networks.

7. The memory module of claim 6 wherein said memory element array is comprised of metal-oxide-semiconductor elements.

8. The memory module of claim 6, wherein said first signals replace other signals stored in said maintenance status register upon identification of a driver circuit malfunction.

9. The memory module of claim 8 wherein said maintenance status register stores fourth signals specifying a mode of operation of said memory module, said modes including a normal mode, a mode wherein said error correcting means is by-passed, a mode wherein said error correcting means and said checking means are by-passed and refresh diagnostic mode.

10. For use in association with a data processing unit, memory module comprising:

a maintenance status register coupled to said data processing unit, said maintenance status register including a plurality of signal storage networks, said maintenance status register signalling to said data processing unit an occurrence of an error;

error checking-correction means for producing parity checks on subgroups of an incoming data group with associated parity check signals, said error checking-correcting means for providing said incoming data group with ECC check bits, said error checking-correction means for correcting outgoing data from said ECC check bits said error checking-correcting means for adding parity signals for subgroup of said outgoing data, wherein an occurrence and a location of a error in said outgoing data is signaled to a second group of said signal storage networks, a more recent error in said outgoing data replacing signals from a previously corrected error;

a plurality of memory elements coupled to said error checking correcting means for storing said incoming data group;

driver circuits coupled to said memory elements to said data processing unit and to said maintenance status register, wherein said driver circuits electrically control said memory elements in response to control signals from said data processing unit, signals designating an occurrence and a location of a malfunction of one of said driver circuits replacing signals stored in said second group of signal storage networks.

11. The memory module of claim 10 wherein said maintenance status register includes a counter means for counting a number of errors corrected in groups of said outgoing data, wherein said number of errors specifies a choice between normal operation of error checking correcting means and a deteriorating memory element.

12. The memory module of claim 11, further comprising:

refresh means for controlling restoration of signals stored in said memory elements; said refresh means coupled to said driver circuits and to said maintenance status register, said refresh means tested in response to control signals from said data processing unit, said refresh means producing signals stored said second group of storage networks upon a malfunction of said refresh means; and wherein signals resulting from an occurrence and a location during said refresh means testing of a malfunction of said driver circuits replaces said signals stored in said second group of storage networks.

13. The memory module of claim 12, wherein said incoming data group contains a plurality of data subgroups, said first group of storage networks also containing signals identifying a one of said data subgroups containing an error.

14. The memory module of claim 13, further comprising:

address means for controlling an address of a group of memory element corresponding to a one of said data groups, said address apparatus, coupled to said data processing unit, said driver circuits and said memory elements, said address means checking address data from said data processing unit for errors and storing a location of said address data error in a third group of storage networks.

15. The apparatus of claim 14 wherein storing of error information is said storage networks causes a first signal to be applied to said data processing unit upon correction of said outgoing data group cause a second signal to be applied to said data processing upon detection of errors in said incoming data groups and causing a third signal to be applied to said data processing unit upon detection of said driver circuit malfunction.

16. The memory module of claim 15 further comprising means for applying signals stored in said maintenance status register to said data processing unit in response to a command signal from said data processing unit.

17. The memory module of claim 9 further comprising means for applying signals stored in maintenance status register to said data processing unit in response to a command signal from said data processing unit.

18. In association with a data processing unit, an improved memory module having an array of memory elements, error checking apparatus, error-correcting-code apaparatus, driver circuits and an address control unit, wherein the improvement comprises:

a maintenance status register coupled to said data processing unit, said error correcting means, said driver circuits, and said address control unit, said maintenance status register storing information localizing errors in incoming data signals localizing errors arising in said memory element, and storing information localizing malfunctions of said drive circuits.

19. The improved memory module of claim 18 further comprising means for differentiating between normal operation of said ECC equipment and an operation correcting for a deteriorating memory element, said differentiation means contained within said maintenance status register.

20. In association with a data processing unit, an improved memory module having an array of memory elements and means for restoring logic signals stored in said memory elements, wherein the improvement comprises:

a maintenance status register coupled to said data processing unit and to said restoration means, wherein said restoration means is tested under control of said data processing unit, said maintenance status register storing information which localizes errors in said restoration means during said testing, said information which localizes errors in said restoration means replaced by information which localizes a malfunction in said driver circuit during said testing.

21. The memory module of claim 20, wherein said restoration means includes a plurality of modes of operation for restoring said logic signals, each of said modes actuated by a predetermined group of signals from said data processing unit, and wherein information identifying said mode is stored in said maintenance status register along with said error signals.

22. In association with a data processing unit, an improved memory module having a plurality of memory elements, address control means for addressing a preselected group of said memory elements, driver circuits for manipulation of said memory elements, parity checking means and error-correcting code (ECC) apparatus wherein the improvement comprises:

a maintenance status register for storing error information including, in adjacency to each other:

means for storing information identifying an occurrence and a location of a driver circuit malfunction, means for storing information identifying an occurrence and a location of data error detected by said ECC apparatus, means for counting and storing information identifying each of said data errors detected by said ECC apparatus, means for storing information identifying an occurrence and specifying a group of incoming data containing a parity error, means for storing information identifying an error in address data, means for storing information identifying a mode of operation presently controlling said memory module operation, and means for transferring said stored error information to said data processing unit, said transferral means connected to each of said storage means and to said data processing unit.

23. The improved memory module of claim 22 further having refresh means for restoration of signals in said memory elements, said refresh means connected to said maintenance status register and to said memory elements, said maintenance status register further including means for storing information identifying an occurrence and location of an error produced by said refresh means during a test procedure under control of said data processing unit.

* * * * *

UNITED STATES PATENT OFFICE
CERTIFICATE OF CORRECTION

Patent No. 3,814,922 Dated June 4, 1974

Inventor(s) Chester M. Nibby, John C. Manton, Benjamin S. Franklin and John L. Curley It is certified that error appears in the above-identified patent and that said Letters Patent are hereby corrected as shown below:

In the Abstract, line 3, delete "identity" and insert --identify--.

In the Abstract, line 4, delete "erros" and insert --errors--.

Column 15, line 24, delete "apparatus" and insert --means--.

Column 15, line 50, delete "apapratus" and insert --apparatus--.

Signed and sealed this 29th day of October 1974.

(SEAL)
Attest:

McCOY M. GIBSON JR.
Attesting Officer

C. MARSHALL DANN
Commissioner of Patents

M PO-1050 (10-69)

USCOMM-DC 60376-P69
☆ U.S. GOVERNMENT PRINTING OFFICE : 1969 O—366-334.